United States Patent

[11] 3,587,215

[72] Inventor Wellington W. Porter
 RD #2 Dublin Rd., Waterloo, N.Y. 13165
[21] Appl. No. 848,773
[22] Filed Aug. 11, 1969
[45] Patented June 28, 1971

[54] ASPARAGUS HARVESTER
 8 Claims, 8 Drawing Figs.
[52] U.S. Cl. .................................................. 56/327A
[51] Int. Cl. ................................................. A01d 45/00
[50] Field of Search ............................................ 56/327 (A), 177

[56] References Cited
 UNITED STATES PATENTS
 2,674,838 4/1954 Porter ........................... 56/177
 3,328,943 7/1967 Marmorine et al. .......... 56/327A
 3,472,009 10/1969 Porter ........................... 56/327A

Primary Examiner—Louis G. Mancene
Assistant Examiner—J. N. Eskovitz
Attorney—F. P. Keiper

ABSTRACT: Harvester for asparagus comprising a frame having wheels, and an arch and a rigid forward extending drawbar disposed on one side of the frame, a second floating frame disposed forwardly of the arch, with respect and springs to counter balance the weight of the forward frame, a transverse cutter bar assembly extending transversely across the lower end of the second frame and adapted to cut at ground level, a wide conveyor having a rigid frame and including inclined side members affixed rigidly to the cutter assembly support and second frame, springs resiliently suspending the upper end of the inclined side members of the conveyor from the arch, and a link swivelly connecting the arch and upper end of the conveyor to support the upper end thereof with freedom of movement by reason of its affixation to the second frame, and fan blades immediately over the cutter assembly for blowing asparagus upon the conveyor.

FIG.6

ASPARAGUS HARVESTER

This invention relates to a harvester for asparagus.

The harvesting of asparagus, as accomplished manually, requires considerable labor since it is necessary to cover the asparagus bed on many successive days in order to harvest the full grown asparagus stalk. While such full grown stalks are harvested for the farmer's market, it is not requisite that the harvest be restricted to full grown stalks for canning and frozen food packaging. During good weather conditions, asparagus stalks may appear and grow to full height within the passage of a day or so and such stalks emerge from the ground in this manner over a period of a number of weeks. Frequent cutting at ground level results in increased new growth.

The present invention is directed to an improvement over the apparatus disclosed in copending application Ser. No. 484,326 filed Sept. 1, 1965, now Pat. No. 3,472,009. The apparatus is adapted to quickly cover large acreage of asparagus beds, harvesting the asparagus stalks close to the ground over a relatively wide width whether full height or of less maturity, it being desirable to be able to cover the acreage quickly and effectively every day or so during the extended harvest season.

The apparatus employs a single wide cutter adapted to float forward of the frame and cut substantially at ground level all stalks which may have emerged since the previous harvest. Immediately upon the cutting thereof, the stalks are blower swept across the cutter onto an elevating conveyor which floats with the cutter bar to carry the stalks and any other debris to the rear of the apparatus to a central loading conveyor where the stalks are separated from lighter material, the latter being lifted from the loading conveyor, to be airborne and discharged by blower operation to one side of the apparatus, as the apparatus is drawn over the asparagus beds.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts.

Figure 7:
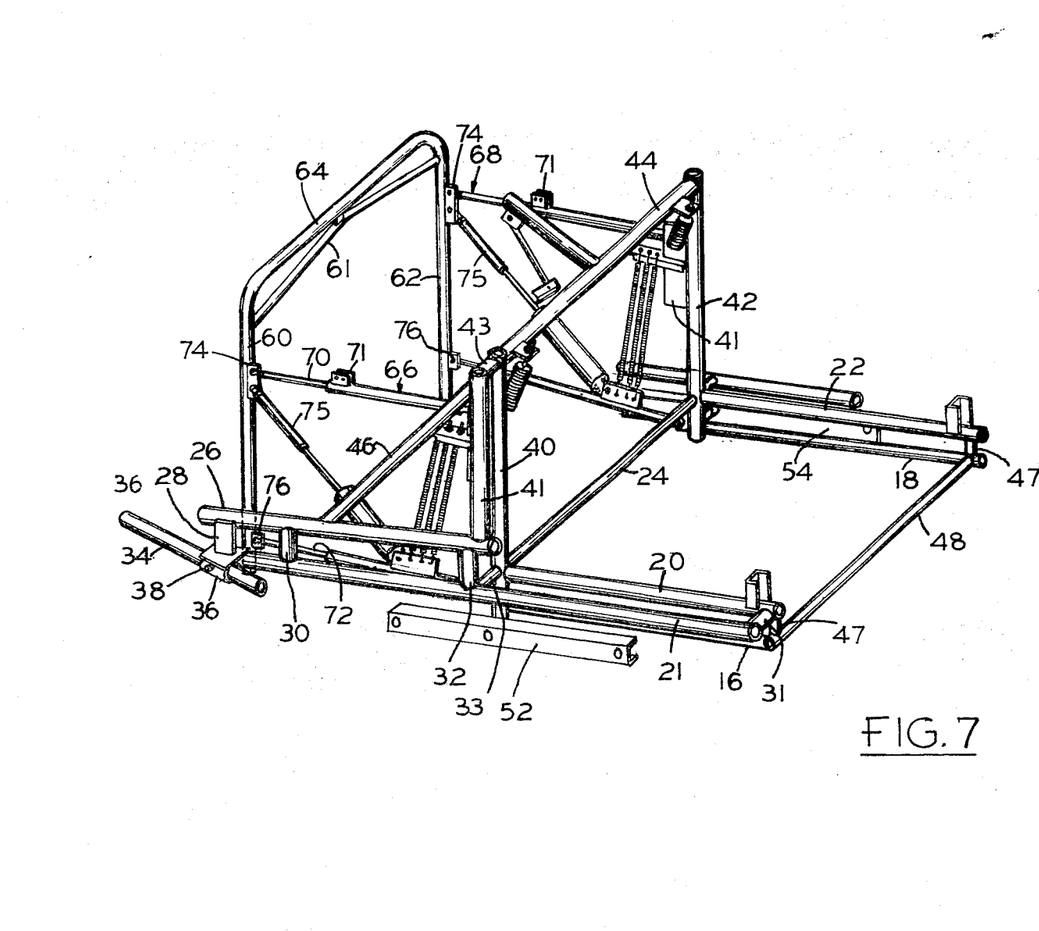
FIG. 7 is a schematic diagram of the framing for supporting the floating conveyor and cutter bar.

Referring to the drawings, there is shown a harvester for asparagus comprising spaced left and right side frame members 20 and 22 joined by a transverse tubular member 24, such frame being shown in FIG. 7. Outside of the left-hand frame member 20, is a draw bar frame comprising member 21, and member 26 disposed thereabove, and rigidly connected by tubular uprights 28, 30 and 32. The member 21 is rigidly connected to member 20 as by short tie members 31 at the rear and forwardly as at 33 in alignment with member 24. The frame members 20 and 22 are provided with heavy tubular uprights 40 and 42 which are connected by a crossmember 44. The frame members 20 and 22 are further strengthened by members 16 and 18 disposed therebelow and extending rearwardly from the lower end of uprights 40 and 42. The drawbar frame is further rigidified by an upright 41, suitably tied to the upright 40 as at 43, and a diagonal brace 46 is provided extending between member 26 and the upper end of uprights 40 and 41 at the tie 43.

The forward end of member 21 is provided with a sleeve 36, disposed at an angle, and in which a drawbar 34 is adjustably secured as by a set screw or pin 38. The drawbar is adapted to extend forwardly to about the center line of the harvester for coupling to a tractor (not shown). The frame members 16 and 20 and 18 and 22 are further tied together at the rear as by short vertical ties 47 and a transverse member 48. From the foregoing, it will be seen that a rigid frame is provided which is entirely open, forwardly of the uprights 40 and 42, and the forward ends of the members 20 and 22 and the lower crossbar 24 and upper crossmember 44, and that the drawbar and its framework, being disposed to one side, is out of the way.

Tandem wheels 50 on each side have their stub shafts mounted on the opposite ends of rocker bars 52 and 54, which are pivoted a few inches off center rearwardly on brackets 53 and 55 affixed to the lower ends of columns 40 and 42 and forward ends of members 16 and 18. The drawbar frame member 21 lies above the rocker bar 52, being spaced by a few inches, and limits the rocking movement. On the other side of the harvester, there is affixed to the frame member 22, laterally thereof a bar 56 for limiting rocking of the rocker bar 54. The offcenter mounting of the rocker bars results in a heavier loading of the rear wheels which facilitates making turns, since the front wheels will more readily slip sideways over the terrain.

An inverted U frame member 61 having upright portions 60 and 62 and a braced crossbar bar 64 is disposed forwardly of the uprights 40 and 42, and connected to the uprights by parallelogram linkages 66 and 68 on opposite sides, each linkage comprising upper and lower struts 70 and 72. The ends of each strut are provided with universal ball swivel joints 74 and 76, whereby the frame member 61 is free to float and twist relative to the main frame, formed in part by the uprights 40 and 42. The lower ends of the upright portions of the floating frame 61 are affixed to the transverse plate of a full width cutter bar assembly 78 of the type shown in U.S. Pat. No. 2,706,374. The structure there shown may be preferably modified to provide cutter teeth having a one inch pitch and three inch stroke, with three teeth to each cutter shoe. The length of the upper struts 70 is adjustable as at 71 whereby the frame 61 may be tilted forward to position the forward cutting edges of the knives of the cutter assembly at ground level. The flexible mounting is in many respects like that shown in Pat. Nos. 2,614,379, 2,674,838 and 2,729,049.

Affixed to the lower ends of the floating frame uprights 60 and 62 are inclined parallel channel members 80 and 82 forming the side rails of an inclined conveyor, the upper ends of which members are provided with upwardly extending channel iron brackets 84 and 86 tied together by a transverse bar 88. At the center of the bar 88 is affixed a rearwardly extending bracket 90, in the form of a support plate with a plurality of apertures 92, in one of which is swivelly secured a suspension bar 94 swivelly hung from a bracket arm 96 extending upwardly and forwardly of the crossmember 44 to which it is welded. The conveyor side rails are provided with springs 85 and 87 extending to crossmember 44 to yieldingly support the conveyor, and as thus supported at the upper end the conveyor is permitted to move relative to the frame as necessary by reason of its affixation to the floating forward frame 61. The lower struts 72 are connected to springs 23 to the uprights 40 and 42 to counter balance the weight, and hydraulic lift struts 75 are provided. Journaled in the conveyor side rails 80 and 82 is a cross shaft 100 having a plurality of half inch pitch sprockets 102 disposed at uniform intervals there along, and over which passes a conveyor belt 103 formed of half-inch mesh, as for example of the "Cambridge"-type.

The upper ends of the channel members are provided with a transverse shaft 104, also provided with sprockets for receiving the mesh conveyor belt. The upper shaft extends beyond the conveyor side rail 82 into a bevel gear drive box 106 which is supported by the shaft 104. Such box 106 has a torque arm 108, and adjustable struts 110 and 112 swivelly mounted at their ends for resisting rotational movement. At the lower end of the conveyor, there is provided an apron 114 with its upper end tangential to and substantially coplanar with the upper reach of the conveyor mesh belt 103. The apron extends forwardly to the cutter bar assembly, immediately to the rear of the cutter knives.

A second pair of channel member supports 116 and 118 extend upwardly from the side rails 80 and 82 of the conveyor. To the rear of the upper ends of such supports are mounted bearings 120 and 122 to receive a transverse drive shaft 124 on which are mounted spaced sprockets 126 and 128. The right-hand end of the shaft 124 is extended into and supports a second bevel gear box 130. The gear box is provided with a torque arm 132 to which the struts 110 and 112 are swively coupled as at 134. A shaft 136 having universal joints couples the gear box 130 for simultaneous drive from the gear box 106.

Extending forwardly and downwardly from the shaft 124 are reach bars 138 and 140, the upper ends of which are journaled about the shaft 124, and the lower ends of which are provided with journals 142 and 144 for a second sprocket shaft 146, having sprockets 154 and 156. The bars 138 and 140 are supported on a transverse member 148 adjustably positioned on tubular uprights 150 and 152 affixed to the channel members 80 and 82. The sprockets 126 and 128 and 154 and 156, are aligned for sprocket chains 158 and 160. The construction will be seen to be similar to that shown in Pat. Nos. 2,674,838 and 2,729,049. Uniformly spaced along and supported by the sprocket chains are transverse angle iron bars 170 to which are affixed blades 164, each blade extending from side to side into close proximity with the side apron members 166 and 168 mounted on the conveyor rails 80 and 82. The height of the shaft 146 is so adjusted as to allow the paddle blades 164 to just clear the ground, the forward ends of the cutter teeth and the apron. The upper shaft 124 is so disposed as to provide a gradual separation between the blades 164, and the upper bed of the conveyor as the blades on the underside of the chains move upwardly along the conveyor. In practice by employing sprockets 154 of about 8 inches in diameter, and sprockets for the conveyor shaft of 4 inches in diameter, and establishing a 2 to 1 ratio between shaft 104 and shaft 124, through suitable gear ratios in the bevel gear boxes 106 and 122, the tip speed of the paddle blades moving above the conveyor and the speed of the conveyor mesh belt will be substantially coordinated and will usually be at a speed substantially equivalent to the forward movement of the harvester.

Figures 3, 8:
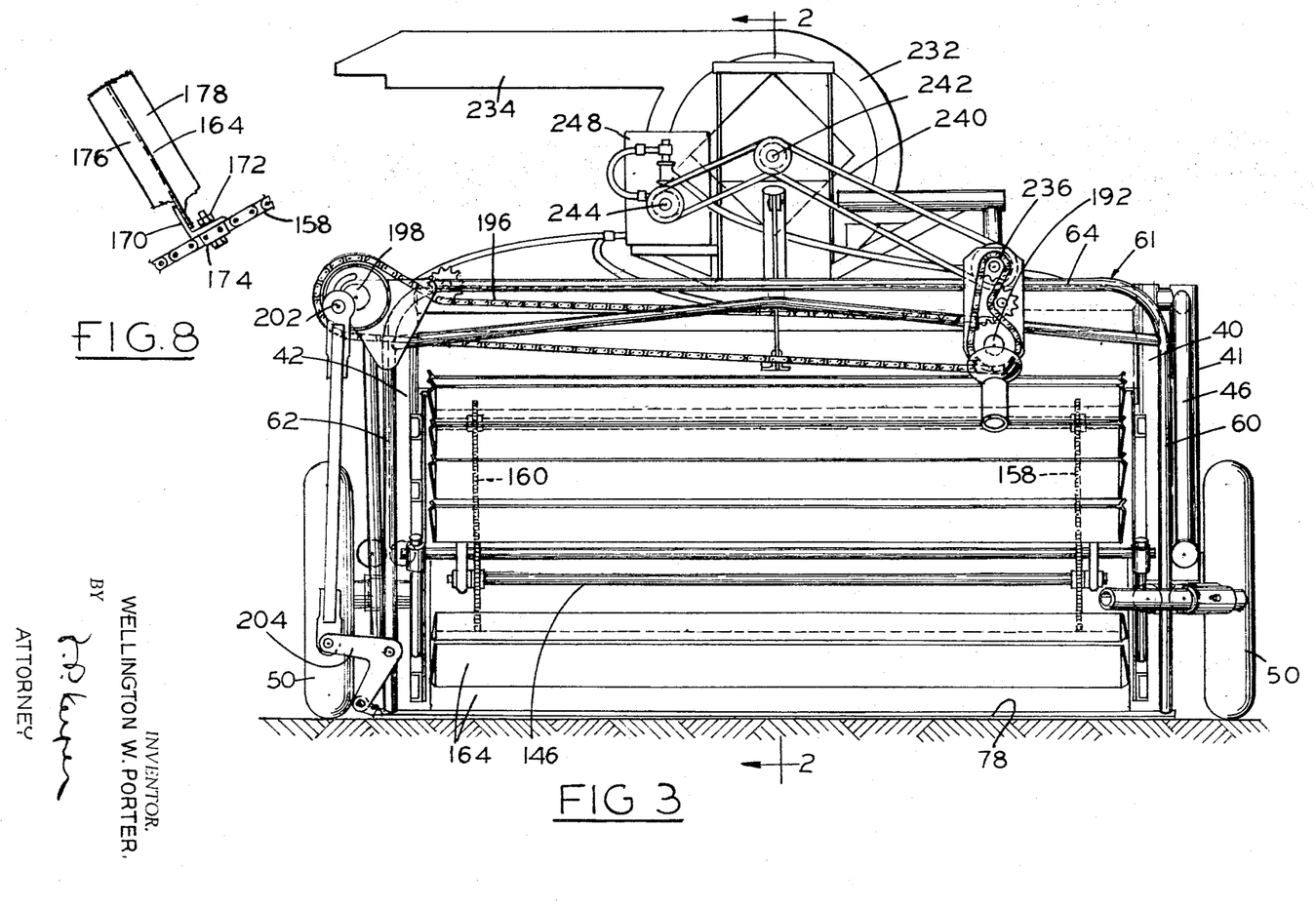
FIG. 3 is a front elevational view.
FIG. 8 is a fragmentary detailed view partly broken away of a blade and the mount on the sprocket chain.
Figure 4:
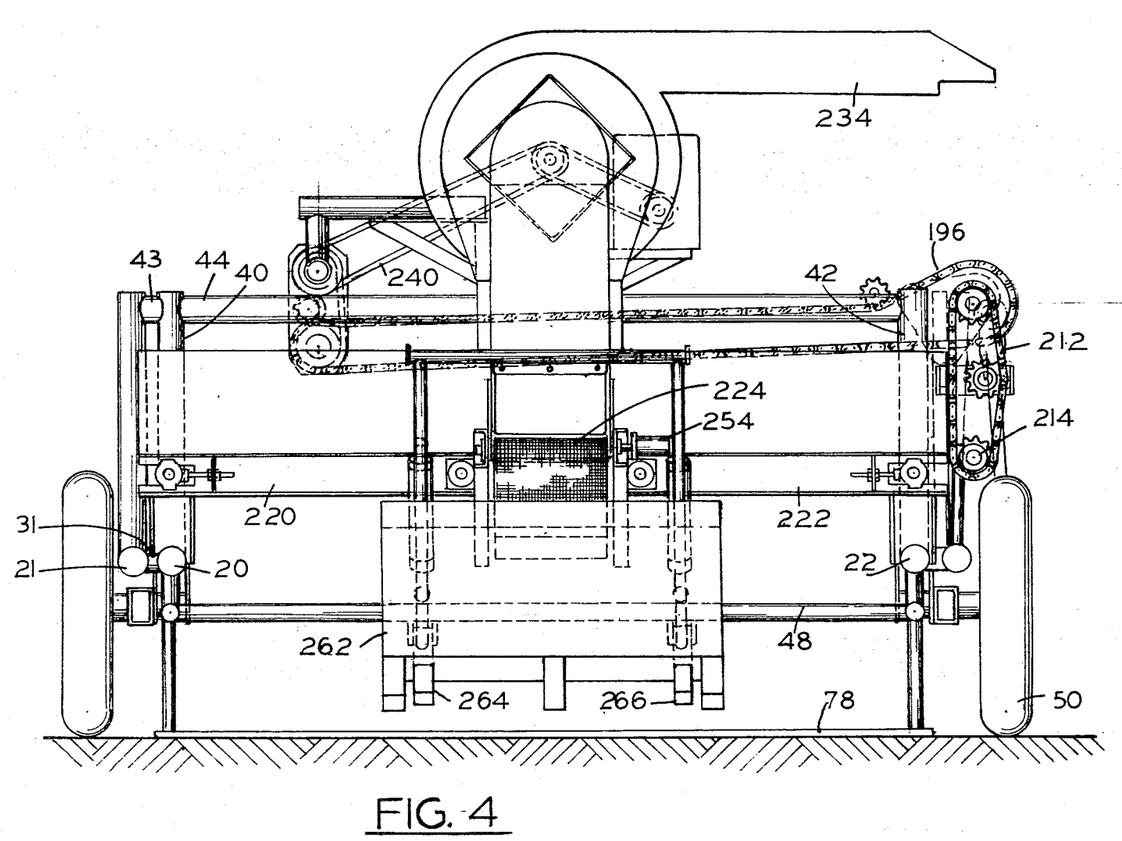
FIG. 4 is a rear elevational view.
Figure 5:
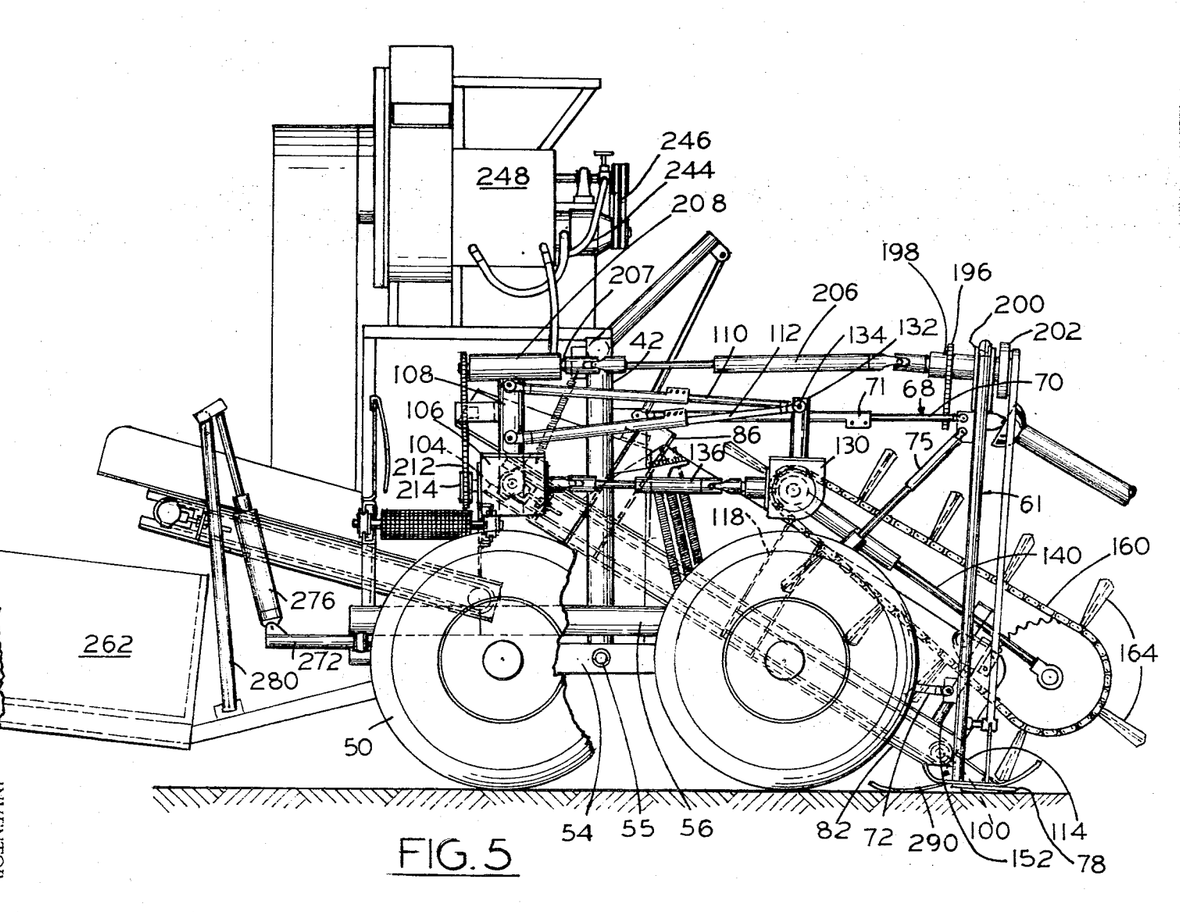
FIG. 5 is a right-hand side elevational view with parts broken away.
Figure 6:
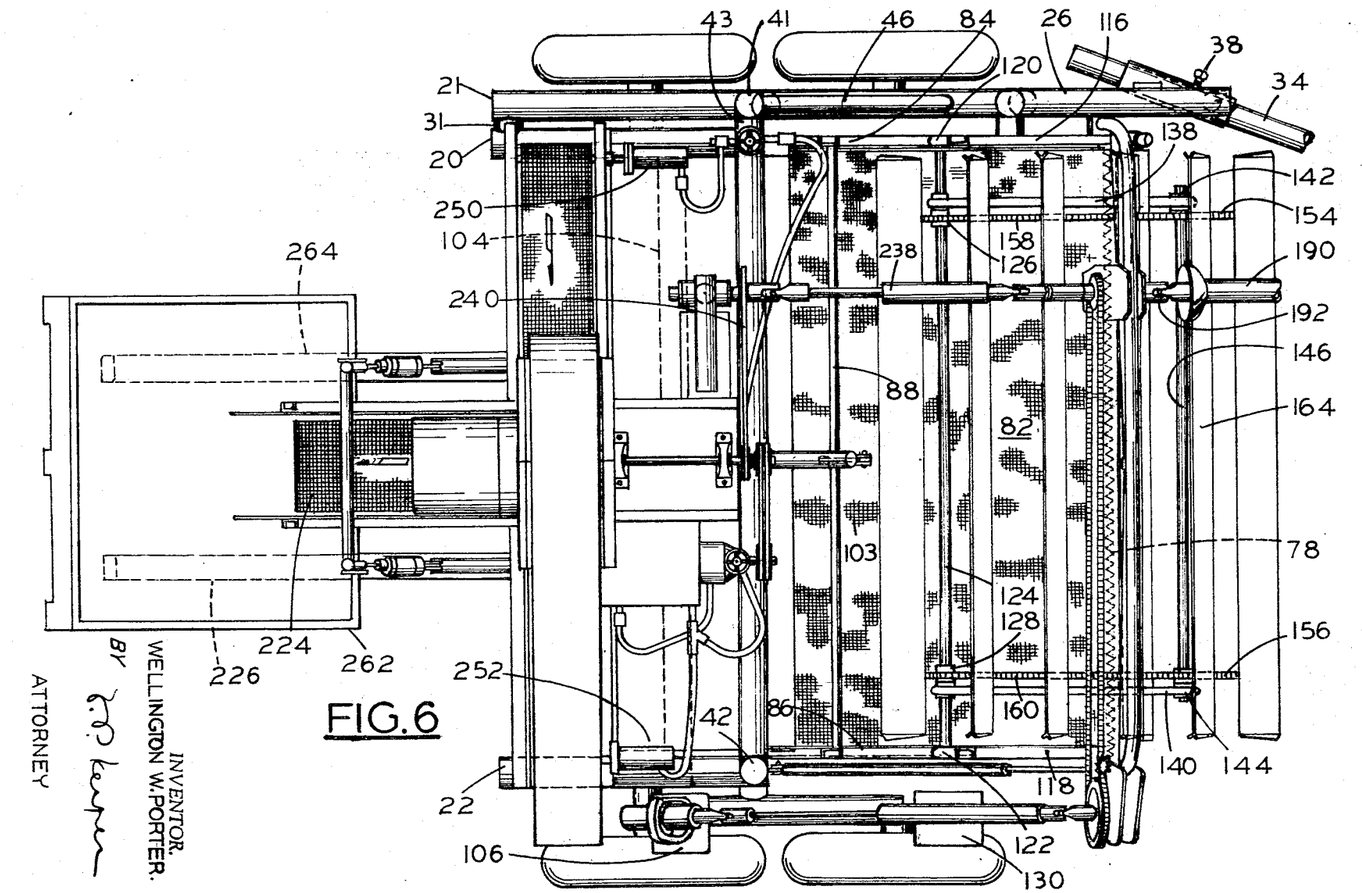
FIG. 6 is a top plan view.

Each of the blades comprises an angle iron 170 bolted as at 172, see FIG. 8, to blocks 174 secured at spaced intervals to the side of chain links of the chains 158 and 160. The paddles 164 are of sheet metal and welded or otherwise secured to the angle irons. The paddle ends are provided with forward and trailing flanges 176 and 178, to prevent air spillage off the ends of the blades as they sweep at accelerated tip-speed around the forward sprockets 154 and 156, creating an accelerated movement of air across the cutter bar and apron to propel and blow the cut asparagus to the conveyor 103, the action being similar to a blower.

Power for operating the cutter bar may be derived from the power shaft of a tractor, which is transmitted to the harvester through a universal drive shaft 190 connected to a jack shaft 192 journaled in bearings 194, on the forward frame 61. By means of a chain drive 196 to the shaft 198 journaled in bearings 200 mounted on the floating frame 61, the crank 202 for driving the cutter bar through bell crank 204 is powered, and power is transmitted to the conveyor shaft 104 by a universal joint transmission shaft 206, the driven end 207 of which is journaled in bearing sleeve 208 mounted on the torque arm 108 extending upwardly from the miter gear box 106 supported on the end of shaft 104. The drive shaft 214 extends through the box 106 and is chain driven as at 212 from shaft 207, and shaft 104 is driven from shaft 214 by miter gears within the box. The shaft 214 is connected by the universal joint shaft 136 to miter gear box 130 which is supported on the end of, and drives shaft 124.

The upper end of conveyor 82 substantially overlies lateral conveyors 220 and 222, and the forward lower end of a central upwardly and rearwardly inclined loading conveyor 224, which receives the harvest directly from the central portion of the conveyor 82, and from the inner ends of conveyors 220 and 222. The conveyors have side panels 226 and a yielding flexible strike curtain 228 to avoid damage to the harvest as it is discharged from the upper end of conveyor 82.

Immediately to the rear of conveyors 220 and 222, and overlying the central portion of conveyor 224 is a suction blower intake 230 to lift light material such as leaves and foreign material from the harvest as it proceeds up conveyor 224. The intake extends to a blower 232 having a side discharge duct 234. The blower may be driven from the tractor power take off through a sprocket and chain drive 236, a universal joint shaft 238, and a belt drive 240 to the blower shaft 242.

A hydraulic power plant 244 may be driven by belt 246 from the blower shaft 242, and oil from reservoir 248 is pumped to hydraulic motors 250, 252 and 254 on the conveyors 220, 222 and 224 respectively.

Figure 1:
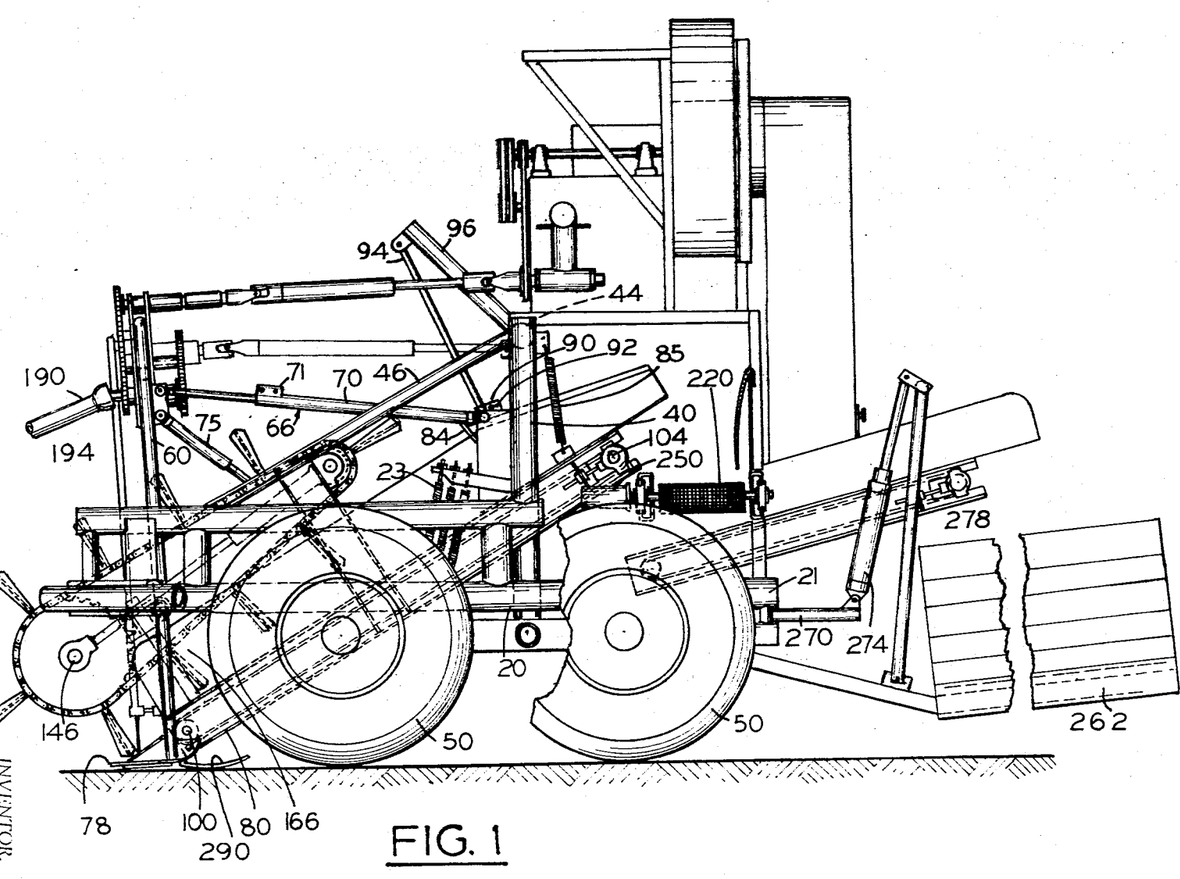
FIG. 1 is a left-hand side elevational view, with parts broken away.
Figure 2:
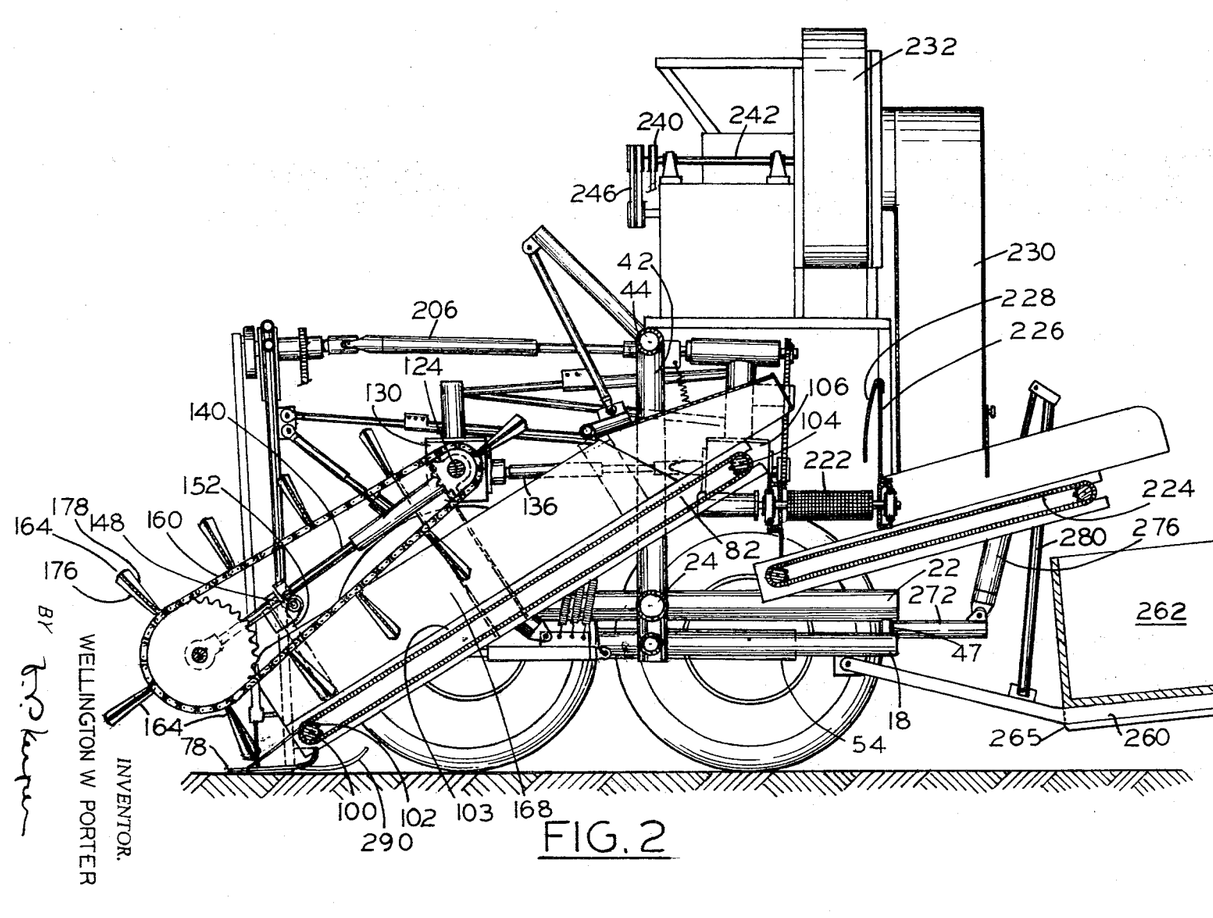
FIG. 2 is a sectional view taken substantially on the line 2-2 of FIG. 3.

To the rear of the apparatus and beneath the discharge end of the loading conveyor 224 is a platform 260 for a pallet box 262 to receive the asparagus. The platform is mounted on spaced arms 264 and 266, the forward ends of which are pivotally connected to the brackets 268 depending from the frame. Arms 270 and 272 rigidly secured to the frame extend rearwardly above the arms 264 and 266 and form perches for hydraulic lift cylinders 274 and 276, the piston ends of which are connected by tension links 278 and 280 to the arms 264 and 266. The lift cylinders are adapted to hold the platform above ground level, approximately as indicated in FIG. 2, so as to clear the ground during harvest travel of the apparatus. When the pallet box 262 is filled, the arms 264 and 266 are lowered, and the apparatus pulled away from the pallet box, which may then be transported, as by a fork lift truck or lifted upon a truck. The arms 264 and 266, are suitably bent as at 265 so that when lowered, they rest evenly on the ground. An empty pallet box is readily slid over the arms, or the apparatus backed up a few feet to slide the arms beneath the box, after which the box is elevated before recommencing harvest.

From the foregoing, it will be seen that with a wide cutter bar any number of asparagus rows within the width, may be cut simultaneously. In addition the cutter assembly, with its nonwarpable conveyor connected thereto are free to float, the upper end of the conveyor being resiliently supported by springs and universally held by the link 94. Thus with the forward end of the frame yieldingly supported by springs 75, and the upper end by springs 85 and 87, and held in position by link 94, the cutter bar is adapted to ride on the ground and cut substantially at ground level, across its entire width at all times. Suitable adjustable height skids on either side indicated at 290 may be used to control the cutter bar. To clear any obstruction, or for transport to or from the field, the lift struts 75 are extended, and the forward frame lifted clear of the ground.

Through the high tip speed of the blades 164 as they round the forward sprockets 154 and 156 the cut asparagus is blown upon the conveyor grid, the mesh of which permits dust and small particles to drop through. The air movement assists the asparagus to move with the conveyor.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

I claim:

1. A harvester for asparagus comprising a frame having wheels, and an arch and a rigid forward extending drawbar disposed on one side of the frame a second frame disposed forwardly of the arch and connected to the arch on either side by upper and lower links swively attached to the arch and forward frame to provide freedom of movement of the second frame, with respect to the arch, means to in part counterbalance the weight of the forward frame, a transverse reciprocatory cutter bar assembly having a reciprocating cutter and stationary support extending transversely across the lower end of the forward second frame and adapted to cut substantially at ground level, a wide conveyor having a rigid frame and including inclined side members having its lower forward end affixed rigidly with respect to the cutter assembly support and forward second frame, means for resiliently suspending the upper end of the inclined side members of the conveyor from the arch, and a link swivelly connecting the arch and upper end of the conveyor to support the upper end thereof with freedom of movement by reason of its affixation to the second frame, and fan means immediately over the cutter assembly for blowing.

2. A harvester according to claim 1 wherein the fan means comprises a lower and upper sprocket shafts each with spaced sprockets and chains mounted above and in fixed relation to the conveyor and a plurality of fan blades extending the width of the conveyor and mounted on said chains at fixed intervals, with the lower sprocket shaft disposed above the cutter assembly at a height whereby the blades sweep over close to the cutter bar to blow cut asparagus into the conveyor.

3. A harvester according to claim 1 wherein the harvester is provided with side aprons and the fan blades are provided with end flanges closely sweeping the side aprons to improve the blowing action.

4. A harvester according to claim 1 wherein a pair of spaced lateral conveyors with mesh conveyor beds running toward the center, are disposed to the rear of and below the inclined conveyor, and a fourth inclined discharge conveyor is provided with a mesh conveyor bed and its forward lower end disposed below the inner ends of the lateral conveyors and below and to the rear of the first conveyor.

5. A harvester according to claim 3 having a blower with a suction intake hood disposed over a central portion of the discharge conveyor.

6. A harvester according to claim 4 having a pallet support frame extending rearwardly from a pivot connection with the first named frame to a pallet support end in an area below the discharge end of the discharge conveyor, and hydraulic means for lifting the pallet support end clear of the ground during harvest transport.

7. A harvester according to claim 1 wherein the conveyor bed comprises a continuous open bed of approximately a half-inch mesh.

8. A harvester according to claim 3 wherein the blade carrying chains and the conveyor bed move at substantial ground speed, and whereby the tip speed of the conveyor blades in rounding the lower sprockets is substantially greater than ground speed.